US008697275B2

(12) United States Patent
Cheon et al.

(10) Patent No.: US 8,697,275 B2
(45) Date of Patent: Apr. 15, 2014

(54) RECHARGEABLE BATTERY HAVING AN EXTENDABLE CASE REGION

(75) Inventors: Sang-Eun Cheon, Suwon-si (KR); Tatsuya Hashimoto, Suwon-si (KR); Seok-Yoon Yoo, Suwon-si (KR); Dong-Wook Kim, Suwon-si (KR); Chi-Young Lee, Suwon-si (KR); Jong-Seok Moon, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 908 days.

(21) Appl. No.: 12/626,451

(22) Filed: Nov. 25, 2009

(65) Prior Publication Data

US 2010/0227215 A1    Sep. 9, 2010

Related U.S. Application Data

(60) Provisional application No. 61/157,522, filed on Mar. 4, 2009.

(51) Int. Cl.
*H01M 2/00* (2006.01)
*H01M 2/04* (2006.01)

(52) U.S. Cl.
USPC .......................................... 429/176; 429/163

(58) Field of Classification Search
USPC ................................................. 429/162–186
See application file for complete search history.

(56) References Cited

U.S. PATENT DOCUMENTS 3,993,507 A    11/1976 Hardigg
4,224,385 A    9/1980 Ciliberti, Jr. et al.
6,037,077 A *  3/2000 Nowaczyk ....................... 429/94
6,391,491 B1 * 5/2002 Kim ............................. 429/178
6,451,474 B1 * 9/2002 Kozu et al. ................... 429/100
6,458,485 B2  10/2002 Yanai et al.
6,645,668 B2  11/2003 Etou (Continued)

FOREIGN PATENT DOCUMENTS

CN       1728435 A      2/2006
CN     101312236 A     11/2008

(Continued)

OTHER PUBLICATIONS

Patent Abstracts of Japan, and English machine translation of Japanese Publication 2000-251927 (12 pages).

(Continued)

*Primary Examiner* — Jonathan G Leong
(74) *Attorney, Agent, or Firm* — Christie, Parker & Hale, LLP

(57) ABSTRACT

A battery including: a case having a case region extendable along a first direction; an electrode assembly housed within the case and including a first electrode, a second electrode, and a separator between the first electrode and the second electrode, the first electrode including a first uncoated region at a first end of the electrode assembly, and the second electrode including a second uncoated region at a second end of the electrode assembly, the second end facing oppositely away from the first end, and the first uncoated region being spatially separated from the second uncoated region along the first direction; and a terminal electrically coupled to at least one of the first uncoated region or the second uncoated region, the case region being between the first uncoated region and the second uncoated region along the first direction.

19 Claims, 7 Drawing Sheets

(56) References Cited

U.S. PATENT DOCUMENTS

| | | |
|---|---|---|
| 2006/0024572 A1* | 2/2006 | Lee .................. 429/161 |
| 2008/0292961 A1 | 11/2008 | Nakai et al. |
| 2009/0206096 A1 | 8/2009 | Hirotsu et al. |

FOREIGN PATENT DOCUMENTS

| | | |
|---|---|---|
| EP | 1 195 822 A2 | 4/2002 |
| JP | 2000-100395 | 4/2000 |
| JP | 2000-251927 A | 9/2000 |
| JP | 2001-229900 | 8/2001 |
| JP | 2002-008632 | 1/2002 |
| JP | 2005-317525 A | 11/2005 |
| JP | 2006-320918 | 11/2006 |
| JP | 2007-059062 | 3/2007 |
| JP | 2008-108742 | 5/2008 |
| JP | 2008-243411 A | 10/2008 |
| KR | 10-2007-0091872 | 9/2007 |
| WO | WO 2006/123666 A1 | 11/2006 |

OTHER PUBLICATIONS

Patent Abstracts of Japan, and English machine translation of Japanese Publication 2005-317525 (12 pages).

Patent Abstracts of Japan, and English machine translation of Japanese Publication 2008-243411 (8 pages).

SIPO Office action and English Translation dated Jun. 20, 2012 for CN 201010106999.X, 15 pages.

European Search Report dated May 11, 2010, for corresponding European Patent application 10155459.0.

SIPO Office action dated Feb. 20, 2013, for corresponding Chinese Patent application 201010106999.X, with English translation, (19 pages).

JPO Notice of Allowance dated Sep. 17, 2013, for corresponding Japanese Patent application 2010-040775, (3 pages).

Patent Abstracts of Japan, and English machine translation of Japanese Publication 2002-008632 dated Jan. 11, 2002, (10 pages).

Patent Abstracts of Japan, and English machine translation of Japanese Publication 2007-059062 dated Mar. 8, 2007, (30 pages).

Patent Abstracts of Japan, and English machine translation of Japanese Publication 2008-108742 dated May 8, 2008, (9 pages).

* cited by examiner

RECHARGEABLE BATTERY HAVING AN EXTENDABLE CASE REGION

CROSS-REFERENCE TO RELATED APPLICATION

This application claims priority to and the benefit of U.S. Provisional Patent Application No. 61/157,522 filed Mar. 4, 2009, the entire content of which is incorporated herein by reference.

BACKGROUND

1. Field

The following description relates to a rechargeable battery.

2. Description of the Related Art

A rechargeable battery differs from a primary battery in that it can be repeatedly charged and discharged, while the latter only irreversibly converts chemical energy to electrical energy. A low-capacity rechargeable battery is used as a power supply for small electronic devices, such as cellular phones, notebook computers, and camcorders, while a high-capacity rechargeable battery is used as a power supply for driving motors in hybrid vehicles and the like.

A high-power rechargeable battery using a non-aqueous electrolyte with high energy density has been recently developed. For example, the high-power rechargeable battery is constructed with a plurality of rechargeable cells coupled to each other in series such that it can be used as the power supply for driving motors in electric vehicles requiring high power.

Furthermore, high-capacity rechargeable batteries are commonly coupled to each other in series. The rechargeable battery may have a cylindrical shape or a prismatic shape.

The prismatic rechargeable battery includes an electrode assembly with positive and negative electrodes and a separator interposed between the two electrodes, a case mounting the electrode assembly therein, a cap plate fitted to the case to seal it and having terminal holes, and terminals inserted into the terminal holes of the cap plate and protruding to the outside of the case.

With the conventional prismatic rechargeable battery, when overcharging continuously occurs, the battery may explode due to a radical elevation in voltage, or the lifespan of the battery may be radically deteriorated.

Although the electric current of the prismatic battery should be interrupted when overcharging occurs, it is not easy in view of the structural characteristics of the prismatic battery to employ a device for stably interrupting the electric current, unlike in a cylindrical battery.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of an embodiment of the present invention is directed toward a prismatic rechargeable battery having advantages of preventing overcharging.

An embodiment of the present invention provides a battery including: a case having a case region extendable along a first direction; an electrode assembly housed within the case and including a first electrode, a second electrode, and a separator between the first electrode and the second electrode, the first electrode including a first uncoated region at a first end of the electrode assembly, and the second electrode including a second uncoated region at a second end of the electrode assembly, the second end facing oppositely away from the first end, and the first uncoated region being spatially separated from the second uncoated region along the first direction; and a terminal electrically coupled to at least one of the first uncoated region or the second uncoated region, the case region being between the first uncoated region and the second uncoated region along the first direction.

The case region may include a plurality of bent portions.

The case region may have at least one of peaks or valleys.

The case region may be entirely between the first uncoated region and the second uncoated region.

The least one of the first uncoated region or the second uncoated region may include a cutout to bisect the uncoated region.

The at least one of the first uncoated region or the second uncoated region may be configured to break when the case region elongates along the first direction.

A thickness of the case region may be thinner than that of other regions of the case.

The at least one of the first uncoated region or the second uncoated region may be configured to interrupt electrical coupling of the electrode assembly to the terminal or the case when the case region elongates along the first direction.

The case may have a first opening at a first end of the case, wherein a first plate is at the first opening of the case, and wherein the terminal is electrically coupled to the electrode assembly through the first plate and exposed out of the case.

The first and second uncoated regions may have no active material, wherein the case may have a second opening at a second end of the case opposite to the first end, and wherein a second plate is at the second opening.

The second uncoated region may be between the second plate and the case.

The electrode assembly may be a wound and folded assembly, and the second uncoated region may be bisected and between the second plate and the case.

The electrode assembly may be a wound and folded assembly, and the second uncoated region may be biased to one side of the case and between the second plate and the case.

The second uncoated region may be welded to the second plate and the case.

The second uncoated region may be electrically coupled to the second plate or the terminal via a lead member.

The lead member may be configured to be break when the case region elongates along the first direction.

The lead member may have a notch, and wherein the lead member may be configured to be broken at the notch when the case region elongates to interrupt the electrical coupling of the first electrode or the second electrode.

The at least one of the first uncoated region or the second uncoated region may have a notch, and wherein the at least one of the first uncoated region or the second uncoated region may be configured to break at the notch when the case region elongates along the first direction.

Another embodiment of the present invention provides a battery including: a case having a case region extendable along a first direction; an electrode assembly housed within the case and including a first electrode, a second electrode, and a separator between the first electrode and the second electrode, the first electrode including a first uncoated region at a first end of the electrode assembly, and the second electrode including a second uncoated region at a second end of the electrode assembly, the second end facing oppositely away from the first end, and the first uncoated region being spatially separated from the second uncoated region along the first direction; and a terminal electrically coupled to at least one of the first uncoated region or the second uncoated region, the at least one of the first uncoated region or the second uncoated region and the terminal being configured to interrupt their electrical coupling when the case region elongates along the first direction.

Another embodiment of the present invention provides a battery including: a case having a case region extendable along a first direction; an electrode assembly housed within the case and including a first electrode, a second electrode, and a separator between the first electrode and the second electrode, the first electrode including a first uncoated region at a first end of the electrode assembly, and the second electrode including a second uncoated region at a second end of the electrode assembly, the second end facing oppositely away from the first end, and the first uncoated region being spatially separated from the second uncoated region along the first direction; and a terminal electrically coupled to at least one of the first uncoated region or the second uncoated region, the at least one of the first uncoated region or the second uncoated region being configured to break its electrical coupling with the terminal when the case region elongates along the first direction.

Another embodiment of the present invention provides a rechargeable battery including an electrode assembly, and a case mounting the electrode assembly therein. The electrode assembly includes a separator, and positive and negative electrodes disposed on respective sides of the separator. The case has a first opening formed at the one-sided end thereof, and a variable region that is capable of being elongated depending upon a variation in inner pressure. A first plate is inserted into the opening of the case and a terminal is electrically connected to the electrode assembly and exposed to the outside of the first plate.

The rechargeable battery may further include a current interrupter for interrupting the electrical connection of the electrode assembly to the terminal or the case pursuant to the elongation of the variable region, and the variable region may have bent portions. Furthermore, the variable region may have convex portions formed on a surface of the case and concave portions formed on an opposite surface thereof. The variable region may be formed with prominent and depressed portions.

The electrode assembly may further include an uncoated region with no active material, and the case may have a second opening at the bottom end thereof. A second plate may be inserted into the second opening, and the uncoated region may be fitted between the second plate and the case. The uncoated region is broken in connection pursuant to the elongation of the case so as to operate as a current interrupter, and a notch may be formed at the uncoated region.

The electrode assembly may be wound and folded, and the uncoated region may be bisected and inserted between the second plate and the case or biased to one side and inserted between the second plate and the case. A cutout may be formed at the uncoated region.

The uncoated region may be attached to the second plate and the case through welding. The electrode assembly may include an uncoated region that is electrically connected to the second plate or the terminal via a lead member.

The lead member may be broken in connection pursuant to the elongation of the case so as to operate as a current interrupter, and a notch may be formed at the lead member. Furthermore, the electrode assembly may have an uncoated region that is electrically connected to the terminal such that it can be broken in connection pursuant to the elongation of the case.

The variable region may be smaller in thickness than other regions, while being greater in elongation than the other regions.

The case may include an upper member mounting a terminal thereon, a lower member spaced apart from the upper member by a distance, and a variable region interconnecting the upper and lower members with greater elongation than the upper and lower members.

The first opening is formed at one end of the case in the direction of the height of the case, and the units of the variable region may be spaced apart from each other by a distance in the direction of the height of the case.

The variable region may be continuously formed along the circumference of the case, and the case may have a prismatic shape.

With an embodiment of the present invention, a variable region is formed such that it can be elongated pursuant to the elevation in internal pressure, thereby easily interrupting the current when the internal pressure is increased.

Furthermore, when the variable region has concave and convex portions, the heat can be easily dissipated owing to the enlarged inner and outer surface area. In addition, when the uncoated region is directly welded to the case, the contact resistance can be reduced.

BRIEF DESCRIPTION OF THE DRAWINGS

The accompanying drawings, together with the specification, illustrate exemplary embodiments of the present invention, and, together with the description, serve to explain the principles of the present invention.

Figure 1:
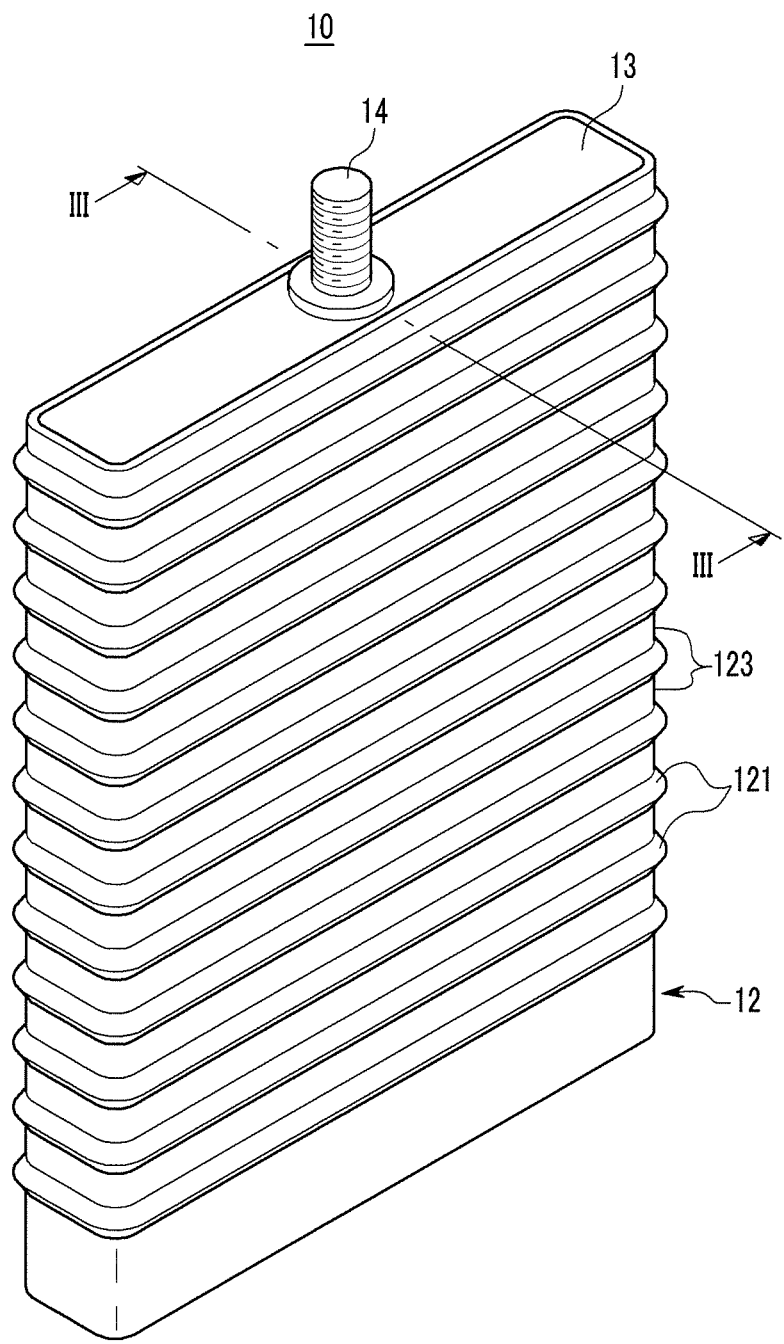
FIG. 1 is a perspective view of a rechargeable battery according to a first embodiment of the present invention.

DESCRIPTION OF REFERENCE NUMERALS
INDICATING ELEMENTS IN THE DRAWINGS

| 10: | rechargeable battery | 12: | case |
|---|---|---|---|
| 121: | variable region | 123: | flat portion |
| 125: | first opening | 126: | second opening |
| 13: | first plate | 14: | terminal |
| 17: | second plate | 20: | electrode assembly |
| 21: | positive electrode | 211: | positive electrode uncoated region |
| 22: | negative electrode | 221: | negative electrode uncoated region |
| 221a: | cutout | 23: | separator |
| 27: | lead member | 275: | notch |
| 32: | variable region | 35: | insulating layer |

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
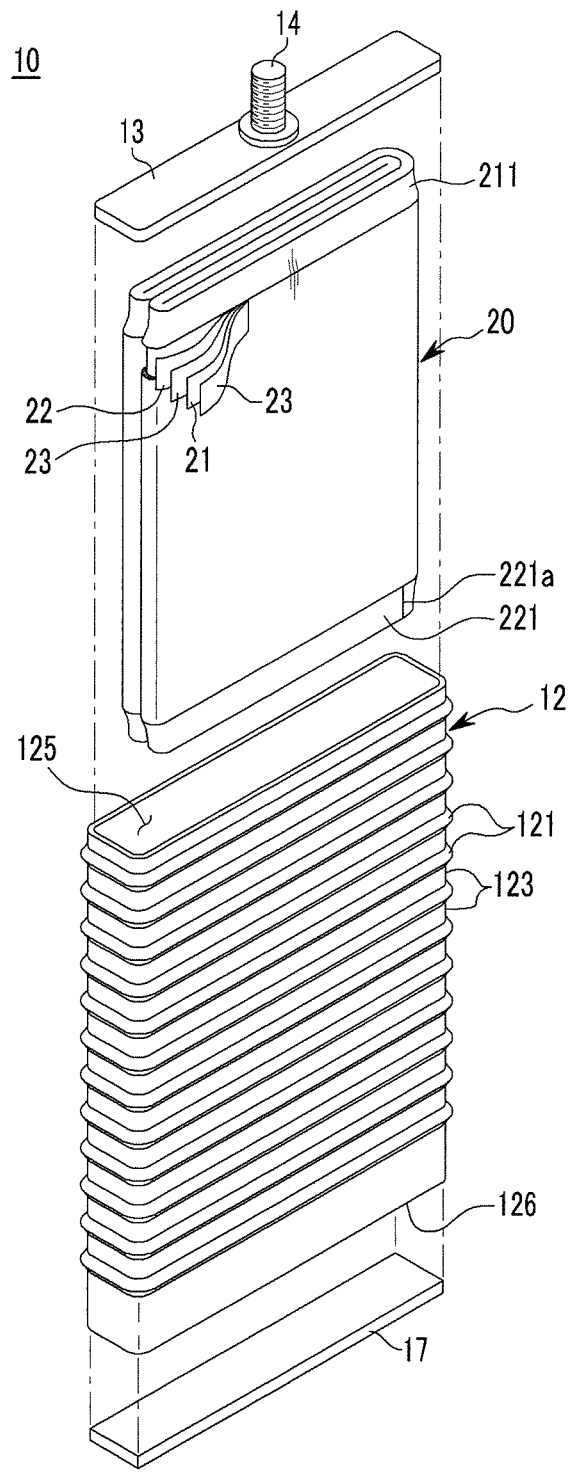
FIG. 2 is an exploded perspective view of the rechargeable battery shown in FIG. 1.

FIG. 1 is a perspective view of a rechargeable battery according to a first embodiment of the present invention, and FIG. 2 is an exploded perspective view of the rechargeable battery shown in FIG. 1.

Referring to FIG. 1 and FIG. 2, the rechargeable battery 10 includes an electrode assembly 20 where positive and negative electrodes 21 and 22 are wound by interposing an insulating separator 23 therebetween, a case 12 mounting the electrode assembly 20 therein, terminals electrically coupled to the electrode assembly 20, and a first plate 13 fitted to a first opening 125 formed at the case 12.

The electrode assembly 20 is formed by winding the positive and negative electrodes 21 and 22 while interposing the separator 23 therebetween. After being wound, the electrode assembly 20 is flatly pressed in the shape of a plate, and is folded such that the outer surfaces thereof contact each other. In this way, when the electrode assembly 20 is folded, a tensional force is generated at the innermost surface of the electrode assembly 20 by way of the bent portion, and the internal surface of the electrode assembly 20 is pulled such that it is positioned substantially parallel to the external surface thereof. Accordingly, the possible formation of wrinkles at the internal surface of the electrode assembly 20 as with the conventional art is prevented so that the internal length of the electrode assembly 20 can be kept uniform. The above structural shape of the electrode assembly is only an example of the present invention, and the electrode assembly may have various structures including a structure that is not folded after the winding, a laminated structure with a plurality of plates, and a cylindrical structure.

A first or positive electrode uncoated region 211 with no positive electrode active material is formed at one end of the electrode assembly 20, and a second or negative electrode uncoated region 221 with no negative electrode active material is formed at the other end of the electrode assembly 20.

The negative electrode 22 has a structure in which a negative electrode active material is coated on a current collector composed of copper and/or aluminum, and the positive electrode 21 has a structure in which a positive electrode active material is coated on a current collector composed of aluminum or the like.

The negative electrode active material may be selected from a carbon-based active material, a silicon-based active material, a titanium-based active material, and combinations thereof. The positive electrode active material may be selected from a carbon-based active material, a nickel-based active material, a manganese-based active material, a cobalt-based active material, a triplet-based active material, an olivine-based active material, and combinations thereof.

It is illustrated with the present embodiment that the positive electrode uncoated region 211 is placed at the upper side and the negative electrode uncoated region 221 is placed at the lower side, but the present invention is not limited to as illustrated. That is, it is possible that the positive electrode uncoated region 211 is placed at the lower side and the negative electrode uncoated region 221 is placed at the upper side.

The case 12 is roughly formed with a quadrangular-shaped tubular structure such that the first opening 125 is formed at the top end of the case 12 and a second opening 126 is formed at the bottom end thereof. The first plate 13 is inserted into the first opening 125, and a terminal 14 electrically coupled with the electrode assembly 20 is installed such that it penetrates through the first plate 13.

A second plate 17 is inserted into the second opening 126, and a negative electrode uncoated region 221 is fitted between the second plate 17 and the case 12. As the negative uncoated region 221 is fitted between the second plate 17 and the case 12 while being bisected (e.g., separated into two portions), a cutout 221a is formed at the negative electrode uncoated region 221 such that the negative electrode uncoated region 221 can be easily bisected.

Figure 3A:
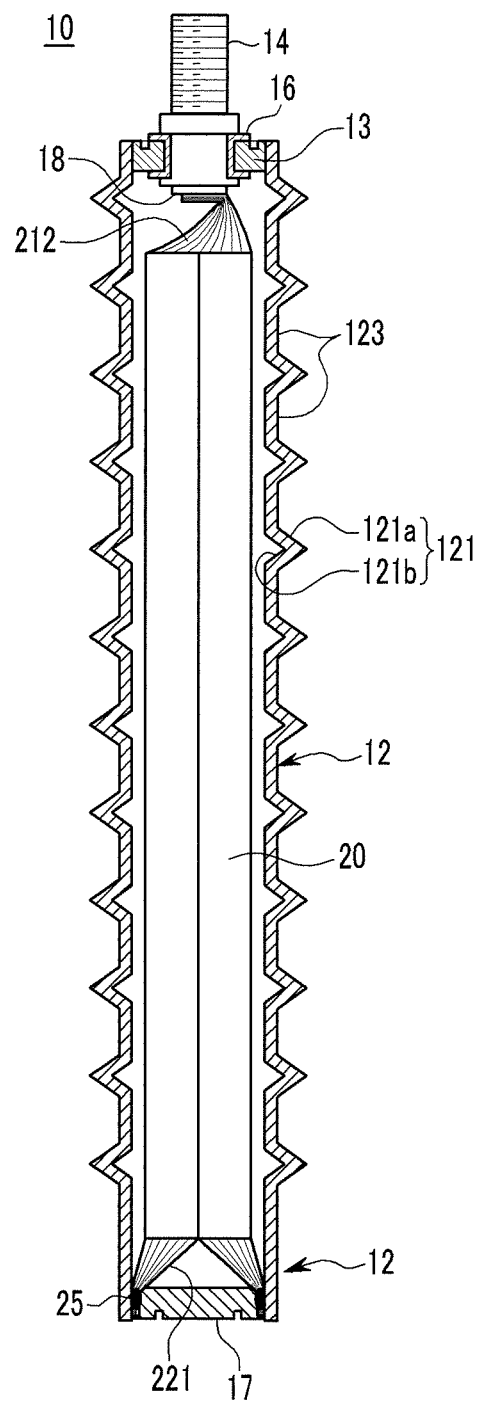
FIG. 3A is a cross-sectional view of the rechargeable battery taken along the III-III line of FIG. 1

Furthermore, a case region (e.g., a variable region) 121 is formed on the circumference of the case 12 such that the length thereof is enlarged as the internal pressure of the rechargeable battery 10 is increased. The case region 121 is continuously formed along the circumference of the case 12, and has peaks and/or valleys, e.g. convex portions 121a formed on the outer surface of the case 12, and concave portions 121b formed on the inner surface of the case 12, as shown in FIG. 3A. It is illustrated in the present embodiment that the convex portion 121a is formed at the external side and the concave portion 121b is formed at the internal side, but the present invention is not limited thereto. It is possible that the concave portion is formed at the external side while the convex portion is formed at the internal side, or that all of the convex and concave portions are formed at the external side.

In one embodiment, a plurality of units of the case region 121 are arranged in the direction of the height of the case 12 such that they are spaced apart from each other by a distance. Flat portions 123 are formed on the case 12, and the bent units (e.g., the peaks and/or valleys) of the case region 121 are interposed between the flat portions 123.

Figure 3B:
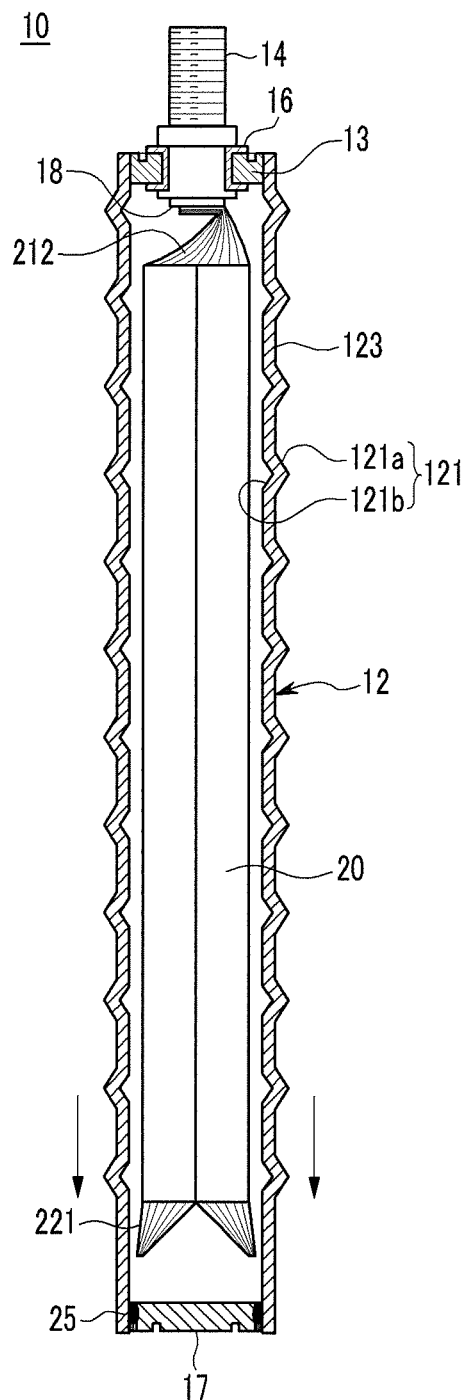
FIG. 3B illustrates the rechargeable battery of FIG. 3A with a case having a case region (e.g. a variable region) where a variable region is elongated pursuant to the elevation in internal pressure within the case.

FIG. 3A is a cross-sectional view of the rechargeable battery taken along the III-III line of FIG. 1, and FIG. 3B is a cross-sectional view of the rechargeable battery of FIG. 3A where the case region of the case is elongated in length pursuant to the increase in the internal pressure within the case.

Referring to FIG. 3A and FIG. 3B, the positive electrode uncoated region 211 is electrically coupled to the terminal 14, and the negative electrode uncoated region 221 is electrically coupled to the case 12. However, the present invention is not limited thereto, and it is possible that the negative electrode uncoated region is electrically coupled to the terminal, and that the positive electrode uncoated region is electrically coupled to the case.

The terminal 14 is installed at the first plate 13 via a gasket 16 such that it is clamped to the first plate 13. A current collecting plate 18 welded to the positive electrode uncoated region 212 is attached to the bottom of the terminal 14 so as to electrically couple the positive electrode uncoated region 212 with the terminal 14.

The negative electrode uncoated region 221 is fitted between the case 12 and the second plate 17, and is attached to the case 12 and the second plate 17 through welding. Accordingly, a welding region 25 is formed at the fitted area of the negative uncoated region 221 between the case 12 and the second plate 17. In this way, when the negative electrode uncoated region 221 is directly welded to the case 12, the number of parts or accessories is reduced so that the productivity is enhanced, and no separate members are required so that the contact resistance can be reduced.

A notch is formed at the negative electrode uncoated region 221 between the welded region and the coated region so that the negative electrode uncoated region 221 may be easily broken in accordance with a pressure (e.g., a predetermined pressure).

Accordingly, the terminal 14 represents the positive polarity, and the case 12 represents the negative polarity. However, the present invention is not limited thereto, and it is possible that the terminal represents the negative polarity, and that the case represents the positive polarity.

Furthermore, the case region 121 is formed by bending the circumferential surface of the case 12 triangularly such that it has protruded convex portions 121*a* externally formed on the case 121, and hollowed concave portions 121*b* internally formed on the case 121. The convex portions 121*a* and the concave portions 121*b* are formed such that they can be flattened or smoothed out at a pressure (e.g., a predetermined pressure).

As shown in FIG. 3B, when gas is generated with the repeated charging and discharging and the internal pressure of the rechargeable battery 10 is elevated to the current interruption level, the concave portions 121*a* and the convex portions 121*b* are flattened or smoothed out so that the variable region 121 is elongated, and the negative electrode uncoated region 221 is broken in connection. Accordingly, the electrical coupling or connection of the negative electrode uncoated region 221 to the case 12 and the second plate 17 is cut so that the current is interrupted. Here, the negative electrode uncoated region is operated as a current interrupter.

In this way, with the present embodiment, when the internal pressure of the rechargeable battery 10 is increased, the case 12 is elongated so that the current can be easily interrupted.

Furthermore, the variable region 121 makes it possible to enlarge the surface area of the case 12 so that the heat generated from the interior of the case 12 can be dissipated to the outside easily. With the present embodiment, the internal surface area of the case 12 as well as the external surface area thereof are enlarged so that the heat generated from the inside can be easily transferred to the case 12.

The breakage pressure of the negative electrode uncoated region 221 can be established depending upon the shape and depth of the notch. Furthermore, with the welding of the negative electrode uncoated region 221, the structural integrity thereof close to the welding region is weakened due to the welding heat. In this connection, the negative electrode uncoated region 221 may be established to be broken at that weakened region thereof.

It is illustrated in the present embodiment that the negative electrode uncoated region 221 is broken in connection with the elevated internal pressure of the rechargeable battery 10, but the present invention is not limited thereto. A notch may be formed at the positive electrode uncoated region 211 connected with the terminal 14 such that the positive electrode uncoated region 211 is broken in connection with the elevated pressure of the rechargeable battery 10.

Figure 4:
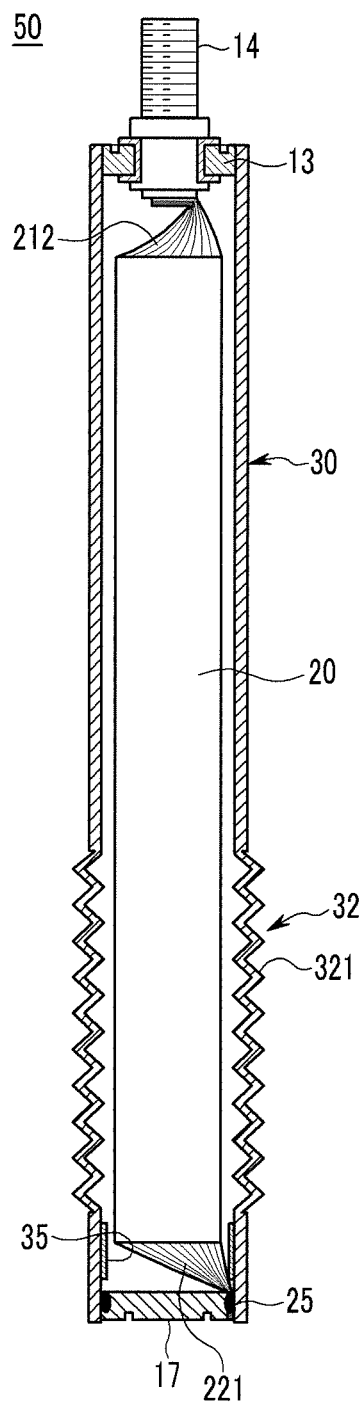
FIG. 4 is a cross-sectional view of a rechargeable battery according to a second embodiment of the present invention.

FIG. 4 is a cross-sectional view of a rechargeable battery according to a second embodiment of the present invention. Referring to FIG. 4, a rechargeable battery 50 according to the present embodiment has the same structure as that of the rechargeable battery according to the first embodiment except for the structure of a case 30, and descriptions of the same structures will not be provided again.

The case 30 has a tubular structure with an interior space for receiving an electrode assembly 20. The electrode assembly 28 is formed by winding the positive and negative electrodes 21 and 22 while interposing a separator 23 therebetween, but, differently from the first embodiment, it is not folded.

The case 30 has a case or variable region 32 that is smaller in thickness than surrounding regions, and includes peaks and/or valleys, e.g., prominent and depressed portions 321 that are formed at the variable region (or case region) 32. The prominent and depressed portions 321 are continuously formed along the circumference of the case 30 such that the convex and concave portions are alternately arranged in the direction of the height of the case 30. Accordingly, the prominent and depressed portions 321 are smaller in thickness than other portions so that they can be easily elongated.

The negative electrode uncoated region 221 is biased to one side, and is inserted between the second plate 17 and the case 30 while being attached thereto through welding. In this way, when the welding of the negative electrode uncoated region 221 is performed at the one side area, the stress is focused at this location so that the breakage can collectively occur at this location.

Further, an insulating layer 35 is formed at the inner surface of the case 30 internal to the insertion region of the second plate 17. The insulating layer 35 protects or prevents the negative electrode uncoated region 221 from electrically contacting the case 30 when the variable region 321 is elongated and resulting in the breaking of electrical coupling or connection of the negative electrode uncoated region 221 to the case 30.

Figure 5:
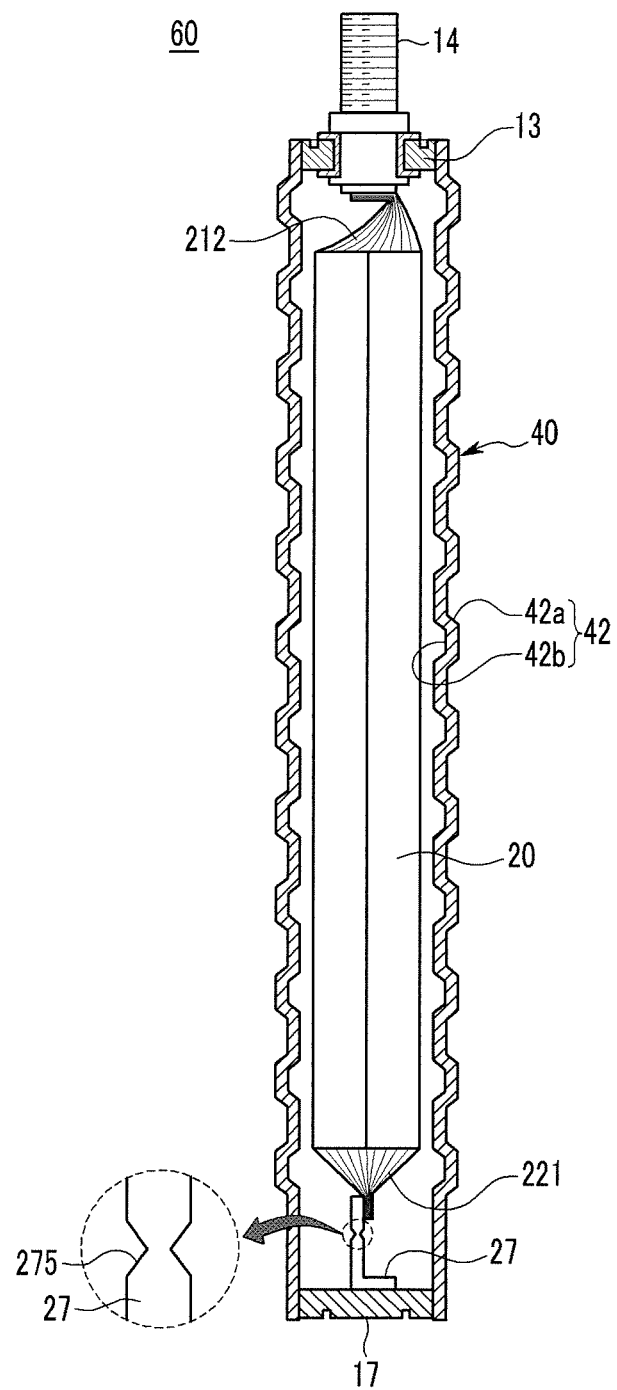
FIG. 5 is a cross-sectional view of a rechargeable battery according to a third embodiment of the present invention.

FIG. 5 is a cross-sectional view of a rechargeable battery according to a third embodiment of the present invention.

Referring to FIG. 5, a rechargeable battery 60 according to the present embodiment has the same structure as that of the rechargeable battery according to the first embodiment except for the interconnection structure of a case 40, an electrode assembly 20, and a second plate 17, and descriptions of the same structures will not be provided again.

The case 40 has a quadrangular horizontal section, and a variable region (or case region) 42 with bent units (e.g., peaks and/or valleys) is formed on the circumference of the case 40. That is, the variable region 42 has peaks and/or valleys, e.g., convex portions 42*a* protruded from the outer surface of the case 40, and concave portions 42*b* protruded from the inner surface of the case 40.

The variable region 42 is continuously formed along the circumference of the case 40, and a plurality of units of the variable region 42 are disposed in the direction of the height of the case 40 such that they are spaced apart from each other by a distance. The unit of the variable region 42 is formed with two inclined sides and a flat side interconnecting the inclined sides such that it roughly has a trapezoidal section. In this way, when the variable region 42 is formed with a trapezoidal section, a passage for passing a coolant can be formed, and stress generated when it contacts a battery or cell barrier neighboring thereto is prevented (or reduced) from being focused at a specific location.

Further, the negative electrode uncoated region 221 is tapered at the center thereof, and is attached to a lead member 27 through welding. The lead member 27 is in turn welded to the second plate 17. Accordingly, the negative electrode uncoated region 221 is electrically coupled to the case 40 via the lead member 27 and the second plate 17.

A notch 275 is formed at the lead member 27. When the case 40 is elongated in height, the lead member 27 is broken due to a pressure (e.g., a predetermined pressure) at the notch 275. With the present embodiment, the lead member 27 operates as a current interrupter. In this way, when the lead member 27 is broken, the current is interrupted only with the breakage of one member so that the current interruption can be made easily.

Figure 6:
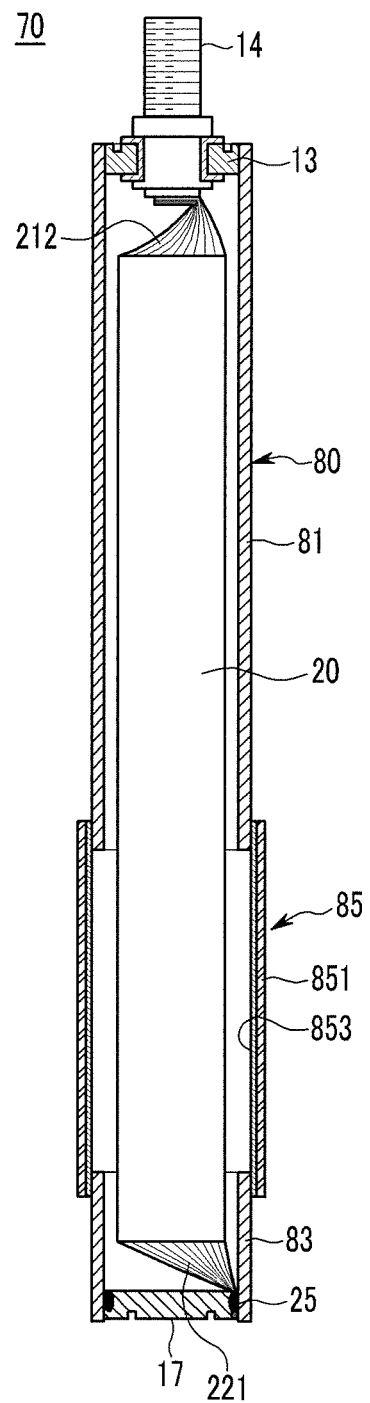
FIG. 6 is a cross-sectional view of a rechargeable battery according to a fourth embodiment of the present invention.

FIG. 6 is a cross-sectional view of a rechargeable battery according to a fourth embodiment of the present invention.

Referring to FIG. 6, a rechargeable battery 70 according to the present embodiment has the same structure as that of the rechargeable battery according to the first embodiment except for the structure of a case 80, and descriptions of the same structures will not be provided again.

The case 80 is formed with a quadrangular horizontal section, and has an upper member 81 to which a terminal 14 is fitted, and a lower member 83 connected to the upper member 81 via a variable region 85. However, the present invention is not limited thereto, and the case may be formed with a circular shape or other shapes.

The variable region 85 accommodates greater elongation than the upper and lower members 81 and 83. The variable region 85 includes a variable plate 851, and a corrosion resistant layer 853 formed on the inner side of the variable plate 851 (on the side thereof facing the electrode assembly). The variable plate 851 may be formed with a metal or polymer, a material having high elongation, or a material that is heat-treated such that it has high elongation. As the corrosion resistant layer 853 is formed with a material that is not reactant with an electrolyte solution, the variable region 85 does not react with the electrolyte solution and the case 80 remains stable in shape. However, if the variable plate 851 is formed with a material that is not reactant with the electrolyte solution, the corrosion resistant layer 853 may be omitted.

With the fourth embodiment of the present invention, if the inner pressure of the case 81 is increased, the variable region 85 is elongated so that the negative electrode uncoated region 221 is broken in connection with the elevated pressure. When the negative uncoated region 221 is broken, the connection of the negative electrode uncoated region 221 to the case 80 is cut so that the current is interrupted.

In view of the foregoing, an embodiment of the present invention provides a battery with a case that varies in length depending on a variation in pressure. Here, in one embodiment, the battery includes the case, an electrode assembly, and a terminal. The case has a case region extendable along a first direction. The electrode assembly is housed within the case and includes a first electrode, a second electrode, and a separator between the first electrode and the second electrode. The first electrode includes a first uncoated region at a first end of the electrode assembly. The second electrode includes a second uncoated region at a second end of the electrode assembly, the second end facing oppositely away from the first end, and the first uncoated region being spatially separated from the second uncoated region along the first direction. The terminal is electrically coupled to at least one of the first uncoated region or the second uncoated region. The case region is between the first uncoated region and the second uncoated region along the first direction.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery comprising:
    a case having a case region arranged around the perimeter of the case, the case region defining a plurality of at least one of peaks or valleys spaced apart from one another along a first direction, the peaks or valleys adapted to permit the case region to be extendable along the first direction;
    an electrode assembly housed within the case and comprising a first electrode, a second electrode, and a separator between the first electrode and the second electrode,
    the first electrode comprising a first uncoated region at a first end of the electrode assembly, and
    the second electrode comprising a second uncoated region at a second end of the electrode assembly, the second end facing oppositely away from the first end, and the first uncoated region being spatially separated from the second uncoated region along the first direction; and
    a terminal electrically coupled to at least one of the first uncoated region or the second uncoated region,
    the case region being between the first uncoated region and the second uncoated region along the first direction.

2. The battery of claim 1, wherein the plurality of peaks or valleys of the case region comprise a plurality of bent portions.

3. The battery of claim 1, wherein the case region is entirely between the first uncoated region and the second uncoated region.

4. The battery of claim 1, wherein the at least one of the first uncoated region or the second uncoated region comprises a cutout to bisect the uncoated region.

5. The battery of claim 1, wherein the at least one of the first uncoated region or the second uncoated region is configured to break when the case region elongates along the first direction.

6. The battery of claim 1, wherein a thickness of the case region is thinner than that of other regions of the case.

7. The battery of claim 1, wherein the at least one of the first uncoated region or the second uncoated region is configured to interrupt electrical coupling of the electrode assembly to the terminal or the case when the case region elongates along the first direction.

8. The battery of claim 1, wherein the case has a first opening at a first end of the case, wherein a first plate is at the first opening of the case, and wherein the terminal is electrically coupled to the electrode assembly through the first plate and exposed out of the case.

9. The battery of claim 8, wherein the first and second uncoated regions have no active material, wherein the case has a second opening at a second end of the case opposite to the first end, and wherein a second plate is at the second opening.

10. The battery of claim 9, wherein the second uncoated region is between the second plate and the case.

11. The battery of claim 9, wherein the electrode assembly is a wound and folded assembly, and the second uncoated region is bisected and between the second plate and the case.

12. The battery of claim 9, wherein the electrode assembly is a wound and folded assembly, and the second uncoated region is biased to one side of the case and between the second plate and the case.

13. The battery of claim 9, wherein the second uncoated region is welded to the second plate and the case.

14. The battery of claim 9, wherein the second uncoated region is electrically coupled to the second plate or the terminal via a lead member.

15. The battery of claim 14, wherein the lead member is configured to break when the case region elongates along the first direction.

16. The battery of claim 15, wherein the lead member has a notch, and wherein the lead member is configured to break at the notch when the case region elongates to interrupt the electrical coupling of the first electrode or the second electrode.

17. The battery of claim 1, wherein the at least one of the first uncoated region or the second uncoated region has a notch, and wherein the at least one of the first uncoated region or the second uncoated region is configured to break at the notch when the case region elongates along the first direction.

18. A battery comprising:
a case having a case region arranged around the perimeter of the case, the case region defining a plurality of at least one of peaks or valleys spaced apart from one another along a first direction, the peaks or valleys adapted to permit the case region to be extendable along the first direction;
an electrode assembly housed within the case and comprising a first electrode, a second electrode, and a separator between the first electrode and the second electrode,
the first electrode comprising a first uncoated region at a first end of the electrode assembly, and
the second electrode comprising a second uncoated region at a second end of the electrode assembly, the second end facing oppositely away from the first end, and the first uncoated region being spatially separated from the second uncoated region along the first direction; and
a terminal electrically coupled to at least one of the first uncoated region or the second uncoated region,
the at least one of the first uncoated region or the second uncoated region and the terminal being configured to interrupt their electrical coupling when the case region elongates along the first direction.

19. A battery comprising:
a case having a case region arranged around the perimeter of the case, the case region defining a plurality of at least one of peaks or valleys spaced apart from one another along a first direction, the peaks or valleys adapted to permit the case region to be extendable along the first direction;
an electrode assembly housed within the case and comprising a first electrode, a second electrode, and a separator between the first electrode and the second electrode,
the first electrode comprising a first uncoated region at a first end of the electrode assembly, and
the second electrode comprising a second uncoated region at a second end of the electrode assembly, the second end facing oppositely away from the first end, and the first uncoated region being spatially separated from the second uncoated region along the first direction; and
a terminal electrically coupled to at least one of the first uncoated region or the second uncoated region,
the at least one of the first uncoated region or the second uncoated region being configured to break its electrical coupling with the terminal when the case region elongates along the first direction.

\* \* \* \* \*